Oct. 17, 1961 A. PERNÍK 3,004,440
CONTINUOUSLY VARIABLE SPEED TRANSMISSION
Filed Oct. 21, 1958 4 Sheets-Sheet 1
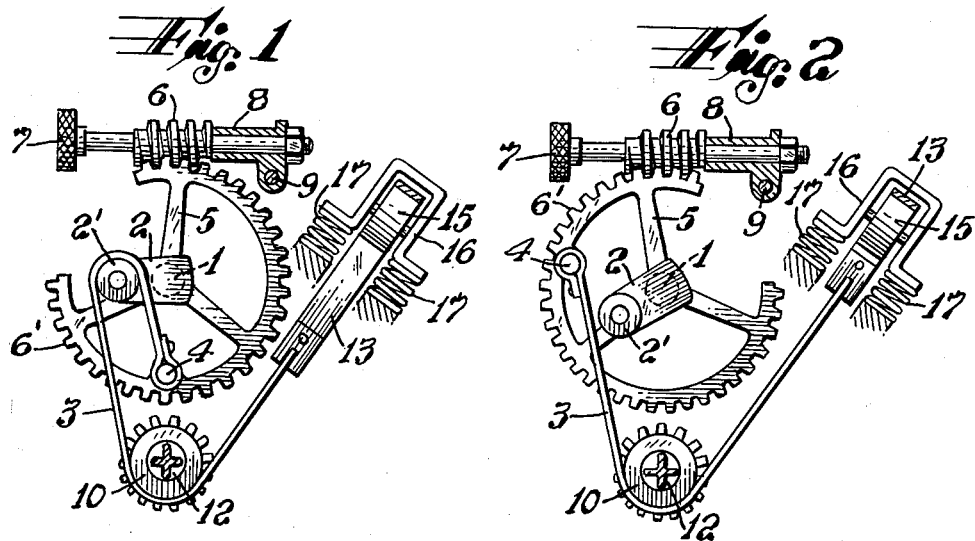
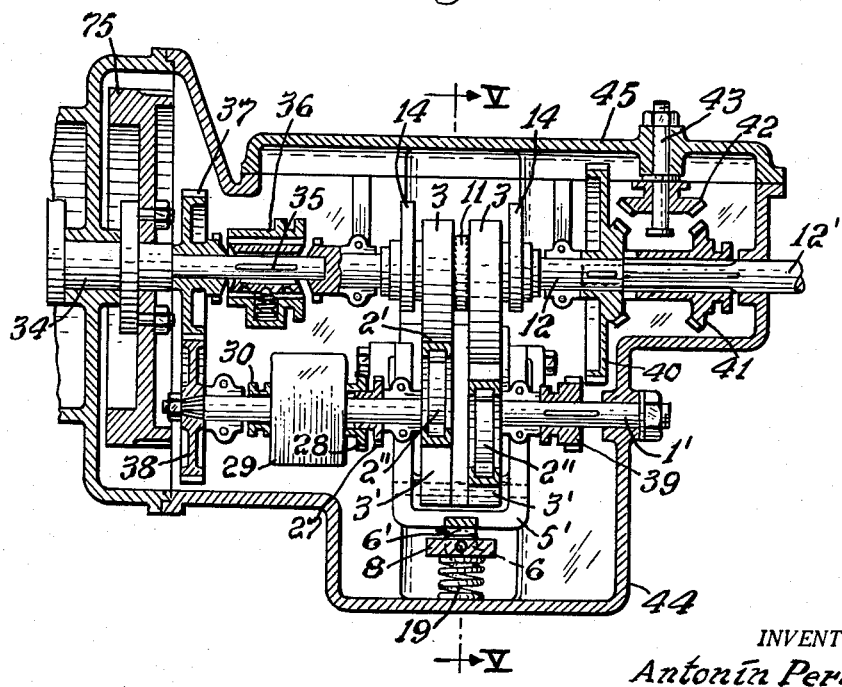
INVENTOR.
Antonín Pernik
BY Richard Ernst
Ag't

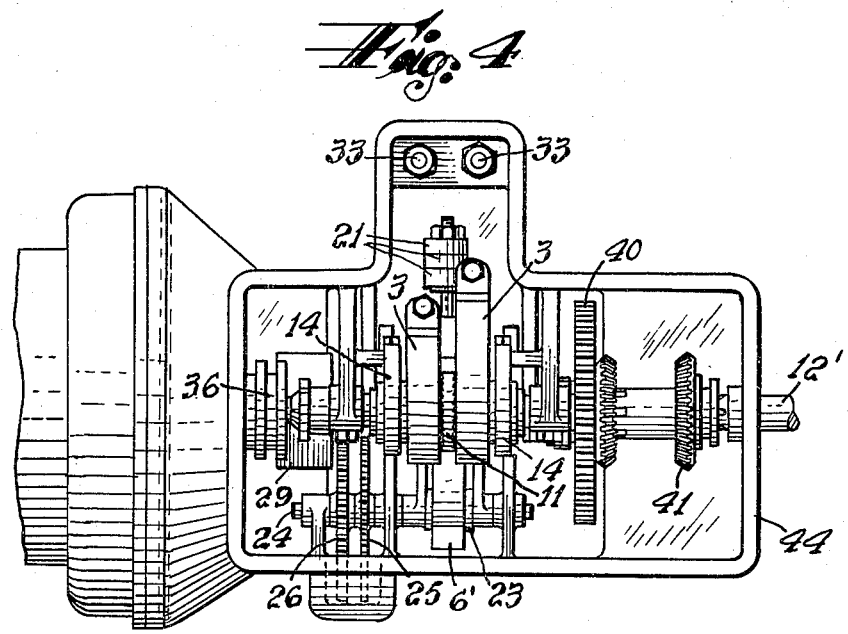
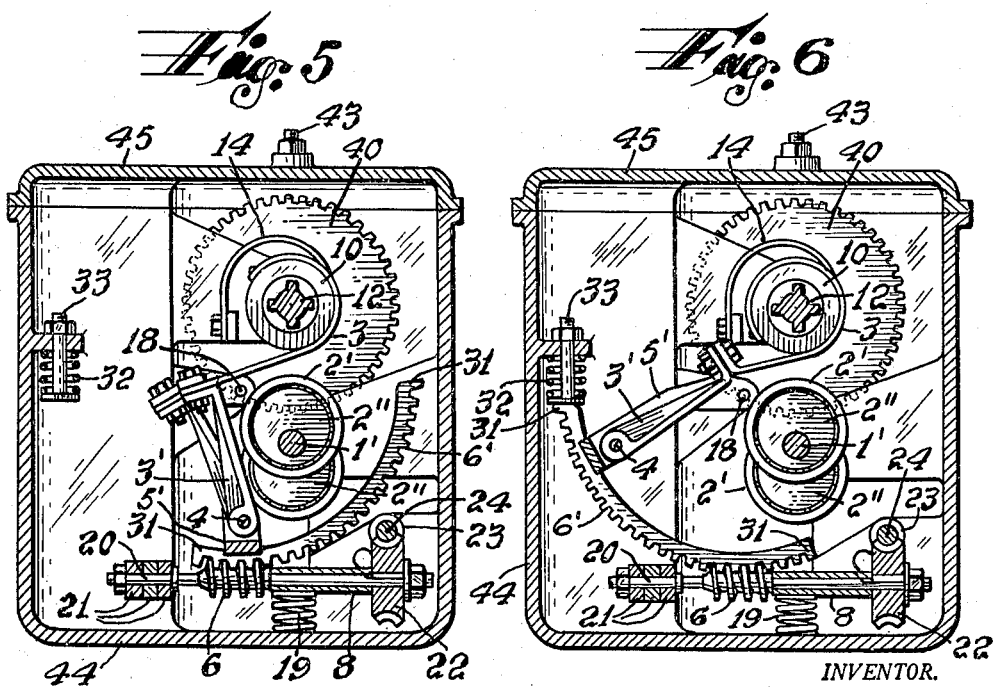

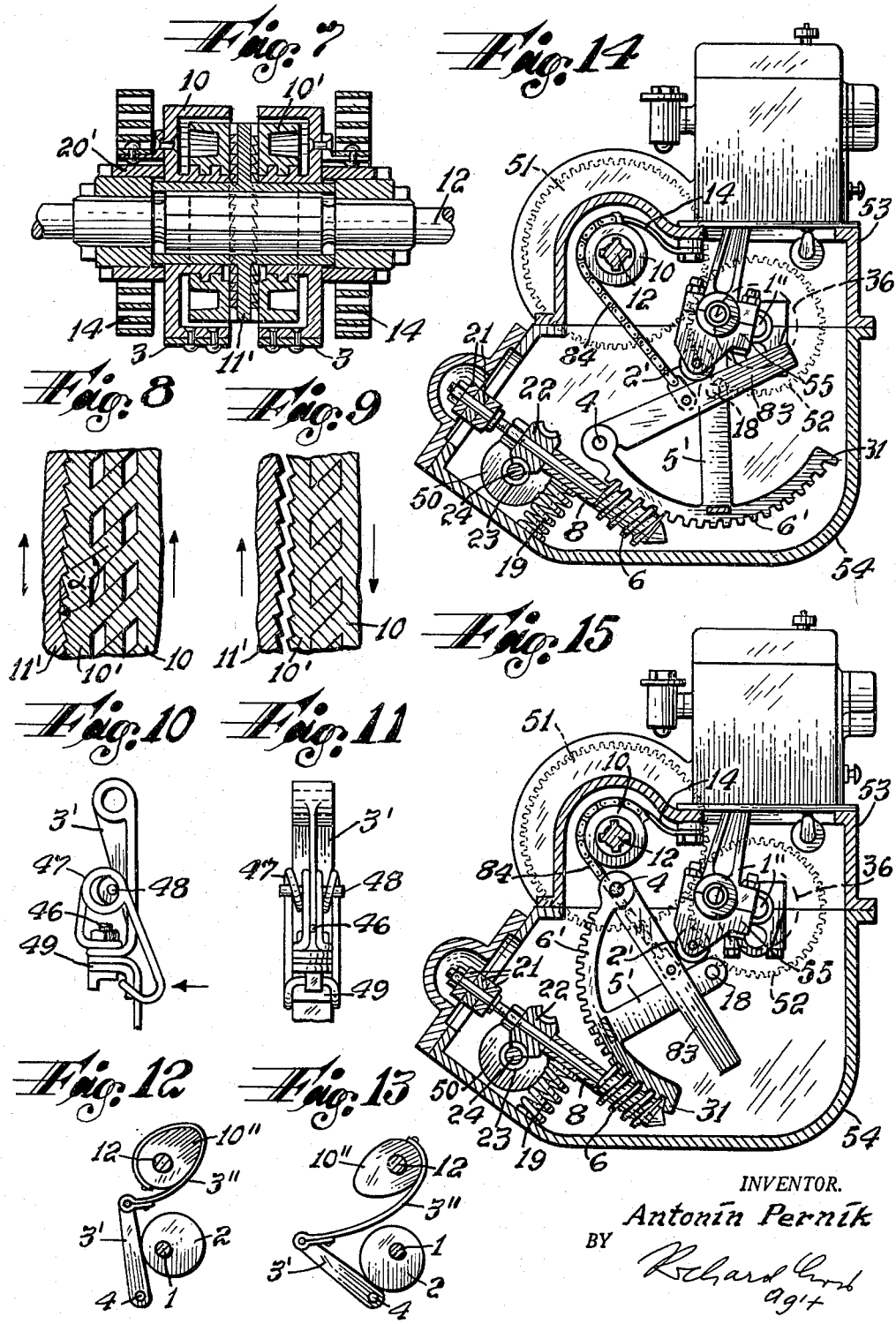

Oct. 17, 1961  A. PERNÍK  3,004,440
CONTINUOUSLY VARIABLE SPEED TRANSMISSION
Filed Oct. 21, 1958  4 Sheets-Sheet 4

INVENTOR.
Antonín Perník
BY

United States Patent Office 3,004,440
Patented Oct. 17, 1961

3,004,440
CONTINUOUSLY VARIABLE SPEED
TRANSMISSION
Antonín Perník, Prague, Czechoslovakia, assignor to
Ustav pro vyzkum motorovych vozidel, Prague, Czechoslovakia
Filed Oct. 21, 1958, Ser. No. 768,627
Claims priority, application Czechoslovakia Nov. 16, 1957
16 Claims. (Cl. 74—117)

This invention relates to continuously variable speed transmissions, and more particularly to a continuously variable speed transmission arrangement of the impulse type in which movement of a driving element is intermittently transmitted to a driven member.

Known transmission arrangements of the impulse type generally have moving parts that are relatively heavy and operate under unfavorable conditions of mechanical stress. The inherent reciprocal movement of these heavy parts sets up shock effects, and transmission arrangements of the impulse type were heretofore subject to fairly rapid wear.

It is a primary object of this invention to provide a continuously variable speed transmission of the type described which is relatively light in weight and reliable in its operation so that it may be successfully employed in transmitting motive power from a prime mover, and more particularly the engine of a motor vehicle, to a driven member, such as the wheels of the vehicle.

Another object is the provision of a transmission which is capable of simultaneously assuming the functions of the usual clutch capable of smooth gradual engagement.

Yet another object is a transmission arrangement which provides a noiseless high transmission speed at which the torque of a driving member is directly transmitted to the driven member without friction losses.

A further object of the invention is the provision of an impact type transmission arrangement in which the most stressed elements of the transmission are under tensional stresses only so that narrow steel strips, wires or wire products of high tensile strength which are readily available may be employed as critically important links in the transmission train, thereby reducing the mass of the moving parts of the transmission arrangement.

An additional object of the invention is the provision of a transmission arrangement that can be easily controlled at all rates of torque transmission between a fully disengaged idling position and direct engagement between the driving and the driven member through the transmission.

With these and other objects in view, the invention contemplates mounting eccentric entraining means on the driven or input shaft of the transmission arrangement so that the entraining means defines an operating circle about the axis of the shaft. An overrunning clutch is mounted on the driving or output shaft of the transmission and capable of actuating movement of the driving shaft in only one direction. An elongated flexible motion transmitting member has one end secured to a control member which is mounted on the transmission frame and is movable thereon along a prescribed path. A driving center portion of the elongated member is trained over a driven wheel of the overrunning clutch for transmitting movement to the output shaft in one direction. A contact portion of the elongated member which is situated between the secured end portion and the driving center portion engages the entraining means and moves in a radial direction in the operating circle of the entraining means when the control member moves along its prescribed path. The motion transmitting member is kept under longitudinal tension at all times.

The exact nature of this invention as well as other features and advantages thereof will be readily apparent from consideration of the following specification relating to the annexed drawing in which:

FIG. 1 shows the main operating elements of a first embodiment of the invention in front elevational, partly sectional view, the transmission being set for high speed output;

FIG. 2 shows the apparatus of FIG. 1 in the idling position;

FIG. 3 shows a second embodiment of a transmission arrangement embodying operating elements modified from those of FIGS. 1 and 2 in side elevational section on the axes of the input and output shafts;

FIG. 4 is a plan view of the apparatus of FIG. 3, the cover of the transmission box being removed to reveal the working elements;

FIG. 5 shows the apparatus of FIG. 3 in front elevational section on the line V—V, the transmission being set for high speed;

FIG. 6 shows the apparatus of FIG. 5 set for idling;

FIG. 7 is a side-elevational sectional detail view of ratchet-type clutches for use in the transmission arrangements of the invention, on an enlarged scale;

FIG. 8 illustrates a detail of a clutch analogous to the clutch of FIG. 7 in front-elevational section on a further enlarged scale in the engaged condition of the clutch;

FIG. 9 is a view corresponding to that of FIG. 8, but in the disengaged condition of the clutch;

FIG. 10 is an enlarged view of the contact portion of the motion transmitting member of the apparatus of FIGS. 3 to 6, and of associated elements, the view being taken in front elevation;

FIG. 11 shows the device of FIG. 10 in side elevation;

FIGS. 12 and 13 show details of a modified motion transmitting member and of associated elements similar to corresponding elements of the transmission of FIGS. 3 to 6 in the relaxed and the tensioned condition of a return spring arrangement respectively;

FIG. 14 illustrates a third embodiment of the invention in sectional front elevation, the transmission being set for high speed;

FIG. 15 shows the apparatus of FIG. 14 in the idling position;

Figure 16:
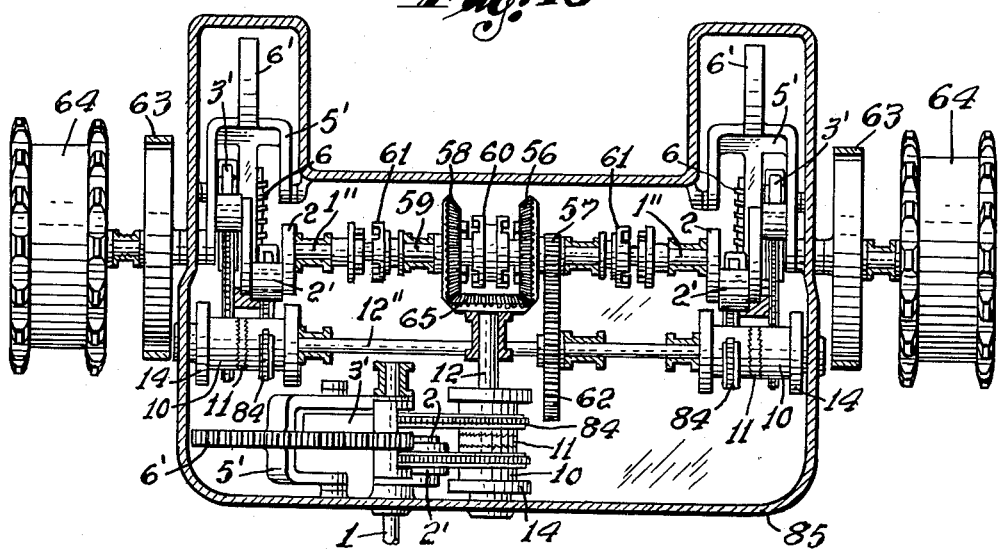
FIG. 16 illustrates the drive of a track-laying vehicle including a fourth embodiment of the transmission of the invention, the device being seen in plan view, partly in section.

Referring now to the drawing, and initially to FIG. 1, the basic operating elements of an infinitely variable speed transmission arrangement of the invention are shown in front elevational, partly sectional view. The driven or input shaft 1 carries two cranks 2 which are axially spaced and offset 180°. For the sake of clarity, only one crank 2 is shown in FIG. 1. The eccentric end of the crank 2 carries a rotatable contact roller 2' over which a motion transmitting flexible steel band 3 is trained. One end of the steel band 3 is secured to a pin 4 on a speed control wheel 5 which is freely rotatable on the driven shaft 1. The position of the control wheel 5 is adjusted by means of a worm 6 which meshes with a worm gear rim 6' of the wheel 5 and is actuated by a hand wheel 7. The worm 6 is supported in a bearing bracket 8 which is pivotally mounted on the transmission frame by means of a pivot pin 9 the axis of which is radially offset relative to the axis of the worm 6 in a direction toward the input shaft 1 and parallel to the latter.

The driving or output shaft 12 of the transmission carries an overriding clutch capable of transmitting motion to the output shaft in one direction only. The driven wheel 10 of the clutch is toothed, and the teeth engage mating openings in the steel band 3. The free end of the band 3 is attached to one end of a coupling band 13, also of flexible steel, which is trained over an idler wheel 15. The idler wheel is rotatably mounted on a bracket 16 which is carried by two compression springs 17 on the frame of the transmission.

It will be understood that the second crank 2 on the far side of the speed control wheel 5 cooperates with a second motion transmitting flexible steel band 3 which is fastened to a portion of the pin 4 which passes through the wheel 5 on the far side. The output shaft 12 carries a second overriding clutch for transmitting the movement of the second crank 2 to the output shaft. The free end of the second steel band 3 is fastened to the other end of the coupling band 13.

The aforedescribed device operates as follows:

Clockwise rotation of the input shaft 1, as viewed in FIG. 1, causes the cank 2 to move upward from the position illustrated. Since the band 3 is held taut by the other, non-illustrated, half of the mechanism which operates in the same cycle, but offset by 180°, the movement of the crank 2 is transmitted to the driven wheel 10 of the overriding clutch on the output shaft 12. The clutch is capable of transmitting only clockwise movement to the shaft which is thus actuated.

When the contact roller 2' passes a position in which it is simultaneously aligned with the shafts 1 and 12 and remote from the latter, the direction of movement of the band 3 is reversed and no further power is transmitted by the mechanism illustrated from the input to the output shaft. At the same moment, however, the other crank 2 (not shown) reaches a position of simultaneous alignment with the shafts 1 and 12 in which the other crank is positioned between the two shafts. Farther clockwise movement of the other crank 2 thus causes the other band 3 to be tensioned and power to be transmitted from the input to the output shaft. The two cranks 2 and their associated motion transmitting bands 3 together with the two clutches on the driving shaft 12 substantially continuously transmit power from the driven to the driving shaft.

The transmission ratio of the arrangement described above is determined by the position of the pin 4 relative to the two shafts 1 and 12. As shown in FIG. 1, the pin 4 is simultaneously aligned with both shafts for the highest transmission ratio of which this arrangement is capable. When the pin 4 is moved counterclockwise, as viewed in FIG. 1, the rotary speed of the output shaft 12 is reduced. Finally, the position illustrated in FIG. 2 is reached in which the contact roller 2' during its rotation about the axis of the shaft 1 no longer engages the band 3. The transmission is in its neutral position, and no power is transmitted from the shaft 1 to the shaft 12. All output speeds between the maximum speed of the setting of FIG. 1 and the minimum or zero speed of FIG. 2 can be steplessly adjusted by rotating the hand wheel 7.

The compression springs 17 adjust the position of the bracket 16 in such a manner as to keep the steel bands 3 and 13 tensioned at all times. The springs compensate for any differences in combined length of the steel bands that may be caused by the adjustment of the position of the pin 4, and during the rotation of the cranks 2. The springs 17 also serve to shift the transmission from any speed setting to neutral. The pitch of the worm 6 is such that the worm gear adjustment is self locking and the position of the pin 4 cannot be altered by the tensional stresses transmitted by the band 3. It is possible, though, to swing the worm 6 by the hand wheel 7 about the pivot pin 9, and thus to disengage it from the worm gear rim 6' of the wheel 5. The springs 17 are then free to expand and turn the wheel 5 into a position in which the cranks 2 are out of engagement with the contact rollers 2'.

Control of the output speed of the transmission arrangement between neutral and maximum speed is achieved by shifting the wheel 5 through an arc of less than 360° between the positions of FIGS. 1 and 2. The gear rim 6' is limited in length to that portion of a circular arc which is required for adequate control.

The transmission arrangement of the invention transmits power from the input shaft 1 to the output shaft 12 in pulses the duration and torque of which depends on the position of the pin 4. In the high speed position illustrated in FIG. 1, the band 3 forms an almost closed loop about the contact roller 2', so that the roller is in motion transmitting contact with the band 3 through almost 180° of crank movement, that is, until the other crank is ready to take over. The torque transmitted, however, is at a minimum. As the position of FIG. 2 is approached by turning the hand wheel 7, the time of contact between the roller 2' and the band 3 decreases as the loop formed by the band 3 becomes shorter and flatter. The pulses become shorter, but the torque increases toward the limiting condition in which the duration of the pulse transmitted becomes zero. The number of steps in which speed and torque transmission can be varied by the arrangement of the invention depends essentially on the design of the overriding clutches on the output shaft 12. With clutches of the ratchet type, the transmission ratio can be changed practically in a stepless manner if the number of ratchet teeth is adequate as will be shown hereinafter in a preferred clutch arrangement.

FIGS. 3 to 13 show a modified example of the invention embodied in a transmission for a motor vehicle which permits direct engagement between an input and an output shaft, and continuous variation of the transmission ratio between the high speed of direction transmission and zero speed at a neutral or idling position.

FIGS. 3 to 6 provide overall views of the gear box whereas FIGS. 7 to 13 show details of the apparatus. Referring now to FIGS. 3 to 6 which respectively show the gear box in side elevation, plan view, and front elevation (in two operating positions), the transmission arrangement receives power from an engine, not otherwise shown, by a crankshaft 34 carrying a flywheel 75 in the usual manner. The customary friction clutch is replaced by an equally well known synchromesh clutch 34 which is axially slidable on the shaft 34 and secured against rotation by splines 35. The clutch may be shifted by means of conventional gear shifting mechanism (not shown) between a position in which it engages claws integral with a spur gear 37 for power transmission through another gear 38, a countershaft 1' and other elements at adjustable speed to an output shaft 12, and another position in which it directly engages claws on the output shaft 12, bypassing the variable speed arrangement.

The countershaft 1' carries two cylindrical eccentrics 2" the eccentricity of which is offset by 180°. Contact rollers 2' are mounted on each eccentric by means of anti-friction bearings. A steel band 3 is trained over each contact roller 2' and has one end fastened to a rocker arm 3' which is pivotably mounted on a supporting yoke 5' by means of a pin 4. The yoke is pivoted to the transmission housing 44 by two pivot pins 18. The other end of each steel band 3 is riveted to the driven wheel 10 of a ratchet type overriding clutch 11 on the output shaft 12.

The operation of this device is basically similar to that of the apparatus shown in FIGS. 1 and 2. When the counter shaft 1' rotates, the eccentrics 2" actuate oscillation of the rocker arms 3', and rotary movement of the crankshaft 34 is transmitted to the output shaft 12 in the form of cyclic pulses by means of the steel bands 3 and overriding clutches 11. The idle return stroke of the wheels 10, steel bands 3, and rocker arms 3' is energized by two flat coil springs 14 each of which has one end fastened to a wheel 10 and another end secured to the housing 44.

The supporting yoke 5' is equipped with a worm gear rim 6' for varying the transmission ratio of the device. A worm 6 which engages the rim 6' is rotatably mounted on a bearing bracket 8 which in turn is suspended on a control shaft 24 by two eyes 23. The worm 6 is permanently urged into engagement with the worm gear rim 6' by a spring 19 which abuts against the housing 44. The action of the spring 19 is assisted by the forces which act tangentially on the yoke 5' during operation of the apparatus.

The worm 6 may be swung out of engagement with the worm gear rim 6' by means of cams (not shown) which cooperate with rollers 21 rotatable on an integral extension 20 of the shaft of worm 6. The three rollers 21 permit disengagement of the worm 6 responsive to signals received from three independent sources. One of the cams may be connected to the linkage which actuates the synchromesh clutch 36 for throwing the variable speed transmission arrangement into idling position when the transmission is intended either to idle or to run at high speed (direct drive). A second cam may be actuated from the shifting linkage of the pinion 39 for automatic disengagement when the engine is employed for braking movement of the vehicle as will be described hereinafter. The third cam may be actuated automatically whenever the brake pedal is strongly depressed. The worm 6 may further be connected to a manual operating lever under the direct control of the operator in any desired manner.

When the worm 6 is swung out of engagement with the rim 6', the yoke 5' is automatically swung from the position shown in FIG. 5 to the idling or neutral position illustrated in FIG. 6 by the pressure of the eccentric 2" against the rocker arms 3', by the force of the springs 14, and by additional springs provided for this purpose, but not shown in the drawing. The yoke 5' swings clockwise as viewed in FIGS. 5 and 6 until the forward end of the rim 6' abuts against a bumper pin 33 which is slidably mounted on the housing 44 and is supported by a spring 32 which absorbs the impact of the yoke 5'.

The transmission arrangement shown in FIGS. 3 to 6 is capable of both automatic and manual control of its transmission ratio by means of the following devices:

The shaft of the worm 6 fixedly carries a worm wheel 22 which meshes with a worm 23 on the control shaft 24. This shaft is parallel to the crankshaft 34, countershaft 1' and output shaft 12. As best seen from FIG. 4, the shaft 24 carries a fixedly fastened sprocket wheel 25 and an equally fixed spur gear 26. The sprocket wheel 25 is connected by means of a roller chain to a sprocket 27 the long tubular hub of which is freely rotatable on the countershaft 1'. The gear 26 meshes with a spur gear 28 which also has a long tubular hub concentric with the hub of the sprocket 27 and rotatable thereon, as best seen from FIG. 3.

The two tubular hubs extend into a centrifugal governor 29 which is preferably of the known pseudostatic type and is fixedly mounted on the countershaft 1'. The governor 29 includes a friction clutch having a driving disk and two driven disks which rotate in opposite respective directions when engaged by the driving disk. The two driven disks are fixedly connected to the respective hubs of the sprocket 27 and of the gear 28 which extend into the governor housing.

The governor is adjusted in a well known manner so that at a predetermined speed of the countershaft 1' neither of the driven disks of the clutch is engaged by the driving disk, and the sprocket 27 and gear 28 stand still. Should the engine speed vary from the set speed of the governor because of variations in the relationship between engine output and vehicle resistance, the driving disk of the friction clutch is urged by the force differential between a governor spring and the centrifugal force exerted by the weights of the governor against one or the other of the driven disks whereby either the sprocket 27 or the spur gear 28 are caused to rotate. This rotary movement is transmitted by the sprocket 25 or the gear 26 to the control shaft 24, and thus to the worm 6 by means of the worm 23 and worm 22 to change the position of the yoke 5' and to change the transmission ratio.

The change in transmission ratio continues until the engine speed, and that of the countershaft 1' and of the governor 29 returns to the value for which the governor is set, whereupon the gear 28 and sprocket 27 are again stopped. If desired, the operation of the governor may be influenced or controlled manually by the operator acting on a loose sleeve 30 on the countershaft 1' by means of a linkage (not shown). The sleeve 30 has a portion outside the governor 29 which is provided with a circumferential groove for engagement with a shifting fork, and a portion inside the governor and connected to the driving disk axial movement of which permits the transmission ratio to be changed independently of the speed of the countershaft 1'.

When the sleeve 30 is employed for controlling the friction clutch of the governor 29, the operator need not furnish the energy required for shifting the yoke 5'. This energy is supplied by the countershaft 1' and derived from the engine itself, and the friction clutch serves as a servomechanism control.

In the embodiment illustrated in FIGS. 3 and 4 the governor 29 is mounted on and energized by the countershaft 1' of the transmission. It will be understood that the governor may be mounted on another shaft which could be actuated either by the countershaft 1' or directly by the engine crankshaft 34.

The yoke 5' is equipped with safety cams 31 arranged at the two ends of the worm gear rim 6'. When the yoke 5' is swung beyond a predetermined limit, the cams 31 automatically force the worm 6 out of engagement with the gear rim 6'. This prevents a condition in which the driven disks of the governor 29 would be blocked and would be rapidly worn down by the rotating driving disk. It is evident that signals may be generated by the disengagement of worm 6 by the cams 31 and may be transformed by electrical or pneumatic means into visible or audible signals which draw the operator's attention to the need for taking remedial action, such as shifting into direct gear, or the like.

As shown in FIGS. 5 and 6, the cams 31 are integral with the gear rim 6', but they may also be made separate and adjustable on the gear rim 6'.

The automatic control of the ratio of torque transmission from the engine to the wheels made possible by the afore-described elements results in greatly improved fuel economy and reduces driver fatigue. Since the transmission arrangement covers the entire span of possible transmission ratios from full disengagement to direct gear drive, the need for a friction clutch or its equivalent is entirely eliminated, and the driver is relieved of the work involved in operating a clutch pedal.

An overriding clutch of the ratchet type such as is employed in the transmission of FIGS. 3 to 6 is shown in more detail in FIGS. 7 to 9. The clutch is of the three-element type and has a number of advantages over a conventional two-element clutch of the ratchet type. Elimination of pressure springs for urging the clutch elements into engagement reduces wear of the ratchet, and makes for quiet operation. It is also possible to employ ratchets with teeth shapes which can be produced more cheaply and which are more rigid, hence more durable.

The operating principle of the three element clutch of the invention is illustrated by FIGS. 8 and 9 which show cooperating circumferential portions of the three clutch elements in axial section on a greatly enlarged scale. The driven wheel 10 of the clutch is formed with relatively broad alternating projections and recesses each of which is a short element of a helix about the wheel axis. The projections and recesses on the wheel 10 engage mating recesses and projections on an input ratchet 10' of the clutch. Rotary movement of the wheel 10 and the input ratchet 10' relative to each other toward and away from a position of firm engagement causes axial displacement of the wheel and the ratchet relative to each other. The input ratchet 10' is a disk one radial face of which engages the wheel 10 in the described manner. The opposite radial face of the input ratchet 10' carries serrations in the approximate shape of saw teeth which mate corresponding serrations in a radial face of an output ratchet 11'. The depth of the serrations and the axial length of the projections and recesses is such that the input ratchet 10' may move axially into and out of engagement of the serrations without any disengagement of the projections and recesses which permanently connect the driven wheel 10 with the input ratchet 10'.

Since the motion transmitting flexible steel band 3 is fastened to the wheel 10, the wheel alternatingly performs power strokes indicated by the right arrow in FIG. 8, and idle return strokes indicated by the corresponding arrow in FIG. 9. The helices of the projections and recesses on the wheel 10 and the input ratchet 10' are inclined in such a way that the movement of the wheel 10 and the inertia of the input ratchet 10' will force the input ratchet 10' into motion transmitting engagement with the output ratchet 11' during the power stroke of the wheel, and will disengage the input ratchet 10' from the output ratchet 11' during the return stroke so that the output ratchet which is connected to the output shaft 12 is free to continue its rotation with the shaft. The unidirectional rotation of the output ratchet is indicated by the arrows at the left of FIGS. 8 and 9.

The overriding clutch details of which are shown in FIGS. 8 and 9 is quiet in operation and is not apt to wear rapidly as is the case with spring loaded ratchet arrangements. The effect of the inertia of the input ratchet 10' may be enhanced, if so desired, by a small friction brake permanently applied to the input ratchet 10'. Ultimate engagement of the serrations which connect the input and output ratchets is achieved by the transmitted power of the engine and the inclined configuration of the sides of the serrations. Disengagement of the serrations is also facilitated by the sloping sides of the teeth which guide the ratchets apart when the direction of wheel movement is reversed. The flanks of the serrations on the output ratchet which rise to a serration peak in a forward circumferential direction are shorter than the backward flanks. Both flanks form obtuse angles with the main radial plane of the ratchet, and the serrations are therefore rigid, breakage resistant, and also easy to produce by stamping or rolling without requiring relatively expensive milling or machining operations. The ridges of the serrations may extend radially relative to the axis of the shaft 12, or they may be inclined relative to an exactly radial direction.

An example of actual application of the improved three-element ratchet clutch of the invention to the variable speed transmission arrangement of FIGS. 3 to 6 is shown in FIG. 7. An output ratchet member 11' common to two clutches is fixedly mounted on the splined output shaft 12. It is axially held in place by two lock nuts 20" which abut against the axial ends of the long tubular hub of the ratchet member 11'. The hub extends in both axial directions from the disk shaped engaging portion of the ratchet 11', and each hub portion rotatably carries thereon a driven wheel of one of the overriding clutches 11 to the rims of which a motion transmitting steel band 3 is riveted. The wheels have hubs which are formed with external threads engaging mating threads of the input ratches 10'. The threads act in the same manner as the helical projections and recesses shown in FIGS. 8 and 9, and discussed in detail in the description of those figures. The wheels 10 are backed in an axial direction by threaded rings 20' which engage corresponding external threads on the nuts 20" and are secured against rotation. Flat coil springs 14 are fastened to the wheels 10 for actuating the return stroke of the wheels.

FIGS. 10 and 11 show the rocker arms and associated elements of the appaartus of FIGS. 3 to 6 on an enlarged scale to bring out details not visible in the overall views of the apparatus. The arms 3' are of substantially T-shaped cross section and elongated. The depth of the web of the T decreases from one end of the arm toward the other, the one end being reinforced to provide an adequate bearing for the pin 4 by means of which the arm is pivoted to the yoke 5'. At the other end, the flange extends beyond the end of the web and is bent at right angles toward and transversely of the web, as best seen from FIG. 10.

The motion transmitting steel band 3 is secured to the bent flange portion by means of a bolt 46 which passes sequentially through a bent washer 49, an opening in the band 3, the arm 3' and a lock nut. The washer 49 has substantially the shape of a mirror image of the bent flange portion of the arm 3'. The bending radius of the flange and of the washer is relatively great to prevent premature failure of the band. The arrangement illustrated is preferable to a connection by a pivot pin in requiring less space and no lubrication at any time.

The rocker arm 3' is equipped with a spring 47 which is shaped and arranged to absorb the impact of the eccentric 2" against the arm 3' in intermediate positions of the yoke 5' between positions of idling and of direct gear transmission, when the eccentric is in contact with the arm 3' only during a small portion of the cycle of movement. The spring 47 is made of a single piece of round or flat wire and has basically the shape of a hairpin each leg of which has been coiled into one or several turns and has been bent near the bight portion of the pin into a hook shape. The spring 47 is mounted astride the rocker arm 3' in such a manner that the bight portion may abut against the washer 49. The legs extend obliquely towards the contact face on the flange of the rocker arm 3' and laterally pass it. The coil turns are supported on a pin 48 which is welded to the web of the arm and extends parallel to the flange, and the free ends of the spring 47 are clamped under the nut on the bolt 46.

The spring 47 is tensioned in a direction opposite to the direction of the arrow in FIG. 10, that is, opposite to the direction of impact of the eccentric 2". The latter is wider than the arm 3' by approximately twice the width of the wire from which the spring 47 is made. The eccentric thus must first compress the spring 47 before reaching the arm 3' and the force of the impact is damped. The spring is deflected from the position shown in FIG. 10 in which the bight portion abuts against the washer 49 contrary to the direction of the arrow, into a limiting position in which the bight portion abuts against a projection on the head of the bolt 46.

The damping arrangement may be modified in many ways without departing from the spirit of this invention. The impact of the eccentric 2" may be transmitted to a suitable spring by means of a lever linkage. The damping arrangement may be mounted on the eccentric 2" instead of being provided on the arm 3'. It is also possible to preclude the possibility of impact engagement between the arm 3' and the eccentric 2" by arranging the bumper pin 33 in such a manner that the yoke 5' cannot be entirely shifted to the idling position, that is, that the yoke can only be moved as far as corresponds to a predetermined low ratio of speed transmission at which the eccentric 2" remains in continuous contact with the steel band 3 or the rocker arm 3' which in effect is an extension of the band 3. This arrangement, however, has the disadvantage of requiring a separate friction clutch or the like for starting the vehicle and for idling of the engine.

FIGS. 12 and 13 illustrate a modification of a detail of the apparatus of FIGS. 3 to 6 in which the functions of the motion transmitting steel band 3 and of the return spring 14 are combined in an elongated flat spring 3" of spring steel or the like. The spring 3" tends to coil up into a shape corresponding in diameter and form approximately to the driven wheel of the clutch 11. The spring 3" thus tends to oppose its straightening. It will coil itself as tightly as possible about the wheel, thereby actuating the return stroke of the wheel and of the pocket arm 3', and will urge the yoke 5' into the idling position. The coil shape assumed by the spring 3" in the relaxed condition may be made smaller than the wheel by any desired amount to provide initial tensioning of the spring.

FIGS. 12 and 13 also show a modified wheel 10" as the driven input element of the clutch 11. The wheel has an ovoid cam shape which has the effect of flattening the sine shape of the curve by which the relationship of the angular velocity of the driven wheel of the clutch 11 may be represented as function of time during each stroke of the band 3, 3". The output shaft 12 is thus driven at a more uniform speed. A similar effect could also be achieved by giving the driven wheel of the clutch the shape of an eccentric circle.

The output elements of the transmission arrangement of the invention illustrated in FIGS. 3 to 6, but not described so far will now be discussed.

A wheel 40 which is keyed to the output shaft 12 is provided with two sets of gear teeth which respectively form a spur gear and a bevel gear. Both gears are out of engagement with corresponding other gears during normal operation of the apparatus. The spur gear serves during long downhill drives for engaging the engine with the wheels at a low transmission ratio so that the engine acts as an effective brake. The spur gearing also provides an emergency low gear ratio in the event of failure of the continuously variable speed transmission arrangement.

The countershaft 1' has mounted thereon a pinion 39 which is axially slidable, but secured against rotation on the countershaft. The pinion has a circumferential groove engageable with a shifting fork for axial movement. A linkage under the control of the operator may thus be employed to engage the pinion 39 with the wheel 40 to provide a low gear transmission between the engine and the output shaft. As mentioned above, the same linkage is preferably also connected to one of the rollers 21 on the worm 6 for simultaneously shifting the continuously variable speed transmission arrangement into idling position.

The bevel gearing on the wheel 40 is put into operation for reverse movement of the vehicle only. A main drive shaft 12' is journaled at one end in an axial bore of the output shaft 12, and is also supported in a bearing in the wall of the housing 44. It carries a bevel gear 41 which is formed with integral claws for engagement with corresponding claws at the end of the output shaft 12. The gear 41 is axially slidable on the main drive shaft 12' and is keyed to it for joint rotation. Under normal operating conditions the gear 41 is in the position shown in FIG. 3 in which its claws engage those of the output shaft 12 so that the shafts 12 and 12' rotate at the same speed and in the same direction.

The cover 45 of the housing 44 carries a bevel gear 42 which is rotatable and axially movable on a short shaft 43 fixedly mounted on the cover at right angles to the shafts 12 and 12'. When the engine is to be connected to the wheels in reverse, a linkage (not shown) simultaneously retracts the bevel gear 41 out of engagement of its claws with those of the output shaft 12, and lowers the bevel gear 42 into simultaneous meshing engagement with the gears 40 and 41 for reversing the direction of rotation of the main drive shaft 12' relative to the output shaft 12. In normal operation, when the vehicle is driven forward, the bevel gear 42 is retracted, and the shafts 12, 12' rotate in unison.

The variable speed transmission illustrated in FIGS. 3 to 6 is capable of several modes of operation. For greatest driving convenience, the operator may rely entirely on the continuously variable speed transmission which is entirely automatic and requires the driver's attention only for shifting into reverse gear and for shifting into low gear for downhill braking. For more economical and quieter operation at high speed, the clutch 36 is shifted into direct drive when the continuously variable transmission has reached its highest transmission ratio, that is, when the yoke 5' has reached the position shown in FIG. 5, so that the shaft 12 is rotating at about the same speed as the engine crankshaft 34. Additional devices, known in themselves, may be employed to shift the clutch 36 automatically at the proper relative speeds of the engine and of the output shaft 12. A pseudostatical centrifugal governor similar to the governor 29 may be employed in a manner analogous to the described arrangement.

The continuously variable speed transmission arrangement may be designed in such a way that the highest transmission ratio illustrated in FIG. 5 will result in a speed of the output shaft 12 higher than that of the crankshaft 34 to constitute an overdrive. At all speeds, the overriding clutches 11 provide free wheeling.

It will be obvious to those skilled in the art that the shaft 1' could be arranged coaxially with the crankshaft 34 and could be driven directly thereby, whereas the ratchet clutches 11 would be mounted on offset output shaft 12 which would thus, in effect become a countershaft. Power could be transmitted to a main drive shaft either directly by the shaft carrying the eccentrics 2", that is the relocated shaft 1', or through the continuously variable transmission arrangement and the offset output shaft in such a manner as to provide direct drive, variable speed drive, a reverse gear, engine braking, and automatic control of the transmission ratio in the same manner as disclosed above.

FIGS. 14 and 15 show an embodiment of the transmission arrangement of the invention in which the transmission forms an integral unit with the crank case of the prime mover from which its motive power is derived. This arrangement saves space, weight and cost, and is of particular utility in motorcycles, but also in automobiles, tractors, and other vehicles using internal combustion engines. The crankshaft of the engine serves simultaneously as the input shaft of the transmission arrangement.

The internal combustion engine illustrated in FIGS. 14 and 15 in front-elevational section is of generally conventional design. The engine cylinders of which only one is shown for the sake of clarity are integral with the upper part 53 of the crankcase to which the lower part 54 is flanged. The pistons actuate a crankshaft 1" by means of connecting rods as is usual. The connecting rod cap 55 is equipped with an eccentric pin parallel to the shaft 1" on which a contact roller 2' is rotatably supported. The roller cooperates with a U-shaped rocker arm 83 to which a roller chain 84 is fastened for operation in the same manner as the rocker arm 3' cooperates with the roller 2' and the steel band 3 in the apparatus of FIGS. 3 to 6. The chain 84 is trained over the driven wheel 10 of an overriding clutch mounted on the output shaft 12 of the transmission arrangement. A spur gear 51 is fixedly mounted on the output shaft and meshes with a gear 52 on the main drive shaft of the apparatus. The main drive shaft is coaxial with the crankshaft 1" and obscured by the latter in the showing of FIGS. 14 and 15. A synchromesh clutch interposed between the ends of the crankshaft and of the main drive shaft permits direct connection between the engine and the wheels in the same manner as shown in FIG. 3 at 36, thus bypassing the variable speed transmission if desired. When the engine of FIGS. 14 and 15 is used on a motorcycle, the gear 51 is replaced by a sprocket which drives the rear wheel by means of a chain.

One end of the rocker arm 83 is pivoted by means of the pin 4 to the yoke 5' which is provided with a worm wheel rim 6'. The yoke 5' is angularly adjustable by means of a worm 6 which is pivotally mounted on the control shaft 24 by means of the bearing bracket 8 as previously described. An extension 20 of the worm shaft carries the rollers 21 by means of which the worm 6 can be thrown out of engagement with the gear rim 6'. The worm 6 is rotated by an electric servomotor 50 the output shaft of which is integral with the control shaft 24. The shaft carries a worm 23 in mesh with a worm wheel 22 on the shaft of the worm 6.

The motor is energized by the generator or the storage battery of the vehicle driven by the engine. The operator controls the transmission ratio by a manual or pedal switch which permits him to turn the current on and off, and to reverse the direction of movement of the motor 50. The motor 50 may also be automatically controlled by a pseudostatical centrifugal governor or by a governor of a type similar to that employed in electrical tachometers. The governor is actuated directly or indirectly by the engine crankshaft and is set for a desired engine speed. The governor arrangement may be additionally equipped for direct intervention of the operator, as described above in connection with the governor 29 in FIGS. 3 to 6.

The electric servo motor 50 may be replaced by a fluid actuated motor operated by compressed air from an air brake system, or by oil under pressure from the pressure lubricating system of the engine. These fluid operated motors may be controlled manually or automatically responsive to a governor by means of well known control valves or slide valves.

As seen in FIG. 14, the transmission arrangement is set for the highest available transmission ratio. When the yoke 5' is swung toward the neutral or idling position illustrated in FIG. 15, the transmission ratio is gradually lowered until finally the rocking arms 3' are taken out of engagement with the contact rollers 2'. The transmission arrangement assumes the same position when the crankshaft 1" is directly connected to the main output shaft. In that case, the yoke after reaching the position of FIG. 14 is directly swung to the position of FIG. 15 by temporary disengagement of the worm 6 from the worm gear rim 6'.

In multi-cylinder engines with a plurality of cylinders arranged in line, a roller 2' is preferably mounted on each connecting rod cap and cooperates with an individual set of transmission members including a rocking arm 83, a yoke 5', a chain 84, a clutch 11 and a return spring 14. Such a multiple device transmits power in a particularly uniform manner.

Smoothness of operation is enhanced by the arrangement of the output shaft 12 high on the crankcase, and as closely as possible to the engine cylinders. The energy of the engine piston is transmitted immediately from the connecting rod of the piston to the rocking arm 83 without the delay involved in transmission of energy by means of a conventional crankshaft and a flywheel. The major portion of the energy is transmitted in the initial phase of the power stroke. Running of the engine can be further smoothed by providing two or more output shafts which receive timed pulses from a common crankshaft 1" and transmit them to a jointly driven output member.

The crank arms and the counterweights of the engine crankshaft may also be replaced by two juxtaposed eccentric cams the eccentricity of which is offset by 180° and which actuate oscillation of the rocker arms 83.

In the arrangement illustrated in FIGS. 14 and 15, the contact roller 2' acts upon a terminal portion of the rocking arm 83, and the chain 84 is pivotally attached to the central portion of the arm 83. With this arrangement, the arm remains in contact with roller 2' through all transmission ratios with the exception of the actual idling position. There is no clashing impact between the roller and the rocker arm. This arrangement is equally applicable to transmission arrangements which are not built into the engine, as in the embodiment of the invention illustrated in FIGS. 3 to 6.

A crankshaft could also be built into a transmission as such, separate from the engine. It would carry the equivalents of connecting rods one end of which would be mounted on the shaft and would carry a contact roller 2', whereas the other end would be guided in an arcuate path by a rocking arm. The connecting rods would merely have the function of guiding the rollers 2', and could thus be very light. A crankshaft used in this manner offers a longer stroke than a rotary cam, and is advantageous in some cases.

FIG. 16 illustrates a drive arrangement for a track laying vehicle embodying the transmission arrangement of the invention. The housing 85 houses three transmission units each of which is basically similar to the unit illustrated in FIGS. 14 and 15. The first unit derives motive power directly from an input shaft 1. It fulfills the normal functions of a vehicular transmission in adapting the transmission ratio to the relationship between engine output and vehicle resistance. The other two transmission units cooperate with the two track drive sprockets, and the vehicle is steered by controlling the transmission ratios of these two units.

The input shaft 1 is actuated by the vehicle engine and its movement is transmitted by the first transmission unit to an output shaft 12. A bevel gear 65 is keyed to the free end of the shaft 12 and is in continuous meshing engagement with two bevel gears 56 and 58 which freely rotate on an intermediate shaft 59 perpendicular to the shafts 1 and 12. The opposite faces of the gears 56 and 58 each carry a set of integral claws which are alternately engageable with a matingly shaped clutch member which is axially slidable on the shaft 59, but is secured against rotation. Depending on the engagement of the clutch member 60 with one or the other of the gears 56, 58, the vehicle will move forward or backward. Two crankshafts 1" are supported in the housing 85 in coaxial alignment with the shaft 59. Jaw clutches 61 permit selective coupling of the intermediate shaft 59 to the two crankshafts 1". The track drive sprockets 64 are fixedly mounted on the outer ends of the crankshafts 1".

The crankshafts 1" also carry brake discs 63 adjacent the track drive sprockets 64. When both brakes are applied simultaneously, the vehicle is slowed down or stopped. When one brake only is applied, the vehicle is made to turn on the spot.

The crankshafts 1" each have a single crank pin on which a contact roller 2' is rotatable. The contact rollers are the actuating members of respective transmission units substantially identical with that of FIGS. 14 and 15, but serving in the present instance as a non-dissipative regenerative steering device for steering the vehicle in an arcuate path. The respective clutches 11 of the two transmission units act on a common output shaft 12" on which a spur gear 62 is fixedly mounted. The latter gear permanently meshes with a pinion 57 fastened to the bevel gear 56.

When the vehicle is driven straight forward or backward, both clutches 61 are engaged and both steering transmission units are set for any transmission ratio between the shafts 1" and 12" which is between idling and the ratio of the gear 62 and the pinion 57. When the units are set for idling, the chains 84 and the driven wheels 10 of the clutches 11 stand still.

When the vehicle is to be steered into a right turn, the right hand clutch 61 is disengaged, and the right steering transmission unit is set for such a transmission ratio that the shaft 12″, the spur gear 62, the pinion 57, the bevel gear 56, the intermediate shaft 59, the left hand clutch 61 and the corresponding crankshaft 1″ with its track driving sprocket 64 turn faster than when the left track driving sprocket is directly connected to the engine. The increase in speed is inversely related to the radius of the curve which is to be passed. For a left turn, the left hand clutch 61 is disengaged and the right hand transmission unit is speeded up in an analogous manner.

The radius of the curve traveled by the vehicle may be varied in as many steps as there are teeth or serrations in the clutch 11. In view of the many serrations shown in FIGS. 7 to 9, the variation is practically stepless, and the vehicle may travel around most curves in a continuously arcuate path far superior to the usual movement of such vehicles which conventionally negotiate all curves by moving consecutively over short continuous stretches angularly offset from each other in a discontinuous arc.

The regenerative characteristics of the arrangement shown in FIG. 16 are of great advantage. The engine power which after disengagement of the clutch 61 on the inside of the curve is transmitted to the inside track from the outside track through the vehicle frame by the friction of the inside track with the ground is not dissipated by braking as in conventional tracklaying vehicles, but is regeneratively recuperated. It is transmitted to the intermediate shaft 59 by means of the output shaft 12″, the gear 62 and sprocket 57. It is then transmitted together with the directly transmitted engine power to the outside track by the outside clutch 61, crankshaft 1″, and sprocket 64. The full power of the engine is thus applied to the outside track, and none is dissipated by braking.

The first transmission unit which is connected to the input shaft 1 may be replaced by conventional speed change mechanisms which may also be equipped with reversing gears. In that case it is preferred to transmit the regenerated mechanical energy from the shaft 12″ to the intermediate shaft 59 indirectly through the conventional speed change mechanism by way of gears 65, 56 in order to avoid the need for providing a separate disengageable reverse gear for the gear system 62, 57.

The jaw clutches 61 may be replaced by couplings of many other types without departing from the spirit and scope of this invention. Friction clutches are entirely practical to use, and even disengageable epicyclic gears will serve successfully.

Figure 17:
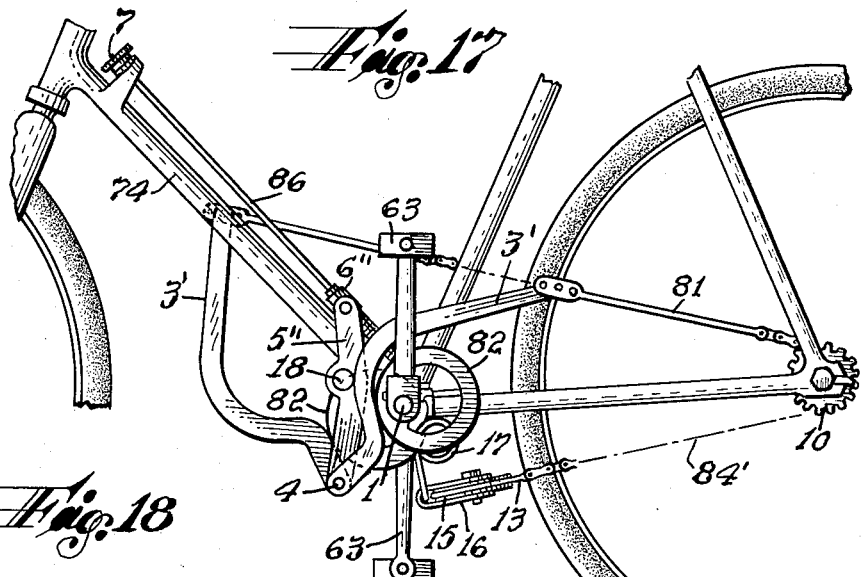
FIG. 17 is a side-elevational view of a fifth embodiment of the invention as applied to a bicycle.
Figures 18, 19:
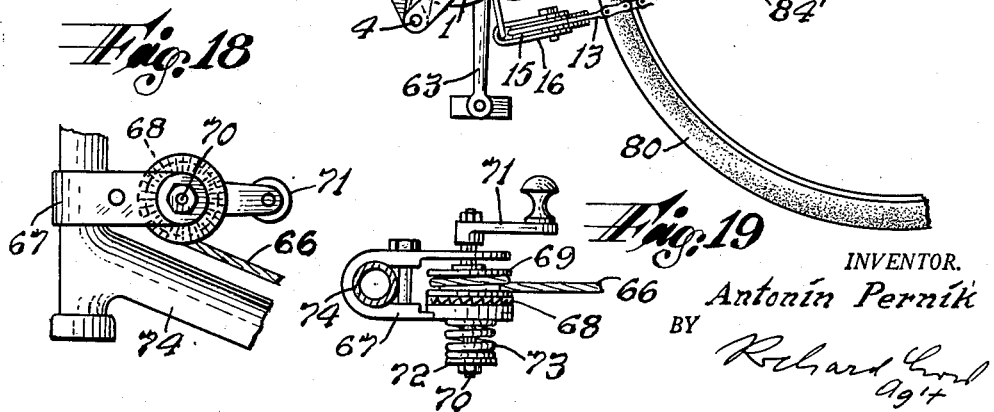
FIG. 18 shows a modified detail of the device of FIG. 17 in side elevation, partly in section.
FIG. 19 is a sectional plan view of the detail of FIG. 18.

FIGS. 17 to 19 illustrate another example of the application of a transmission arrangement of the invention to a vehicle, in this case a bicycle. FIG. 17 shows the lower portion of the bicycle frame 74 with the pedal arrangement and the wheels. Power is transmitted from the pedals to the rear wheel 80 by a transmission arrangement of the invention modified details of which are seen in FIGS. 18 and 19.

The two pedals 63 are mounted on a common driven shaft 1 in the usual manner. A circular eccentric 82 is mounted on the shaft 1 adjacent each of the pedals. To reduce torsional stresses in the shaft 1, each eccentric 82 is integral with or fastened to the crank arm of the coordinated pedal. It will be understood that the eccentric 82 may be equipped with a contact roller 2′ supported on an antifriction bearing. Each eccentric 82 abuts against a rocker arm 3′ which is pivoted at one end to a common pin 4 on one arm of a control member 5″ which is a two-armed lever. The member 5″ is tiltably secured to the bicycle frame 74 by a pin 18.

The free end of each rocking arm 3′ is hingedly connected to one end of a respective rod 81 the other end of which is attached to a roller chain 84′ trained over the driven wheel 10 of an overriding clutch which drives the rear wheel 80 of the bicycle. The spokes of the wheel have been omitted in FIG. 17 so as not to crowd the drawing. The two free ends of the chains 84′ are connected by means of a thin flexible steel cable 13 which passes over an idler wheel 15. The wheel is mounted on the frame 74 by means of a bracket 16 mounted on a spring 17 which tensions the chains 84.

The second arm of the control member 5″ carries a nut 6″ which is rotatable on the member 5″ about an axis transverse of the thread axis of the nut. The nut 6″ is threadedly engaged by a rod 86 which is rotatably mounted on the down tube of the frame 74 in axially fixed position. The transmission ratio between the pedals 63 and the rear wheel 80 is varied when a hand wheel 7 on the rod 86 is turned. The more complex arrangement of the previous examples of this invention in which the transmission can be thrown into an idling position is not required in a bicycle since the motive power supplied by the rider can be stopped at will. Displacement of the nut 6″ forward along the down tube of the frame 74 reduces the transmission ratio between the pedals 63 and the rear wheel 80.

The hand wheel 7, rod 86 and nut 6″ can be replaced by a ratchet mechanism which permits faster speed changes, and such a mechanism is shown in FIGS. 18 and 19 in side elevation and plan view respectively.

Instead of the nut 6″, one end of a cable 66 is fastened to an arm of the control member 5″. The other end of the cable is wound on a drum 69 equipped with axially projecting serrations 68. The drum 69 is fixedly mounted on a shaft 70 which is rotated by means of a hand crank 71. The shaft 70 is rotatable in a forked bracket 67 which is fastened to the head tube of the bicycle frame 74. A face of the bracket 67 opposite the ratchet teeth 68 is formed with corresponding serrations 68. The serrations are urged into axial engagement by a helical spring 73 one end of which abuts from the outside against the bracket 67 whereas the other end presses against a washer 72 on the shaft 70.

When the rider wishes to change the transmission speed, he stops pedalling to relieve the control member 5″ of the reaction of the power input, whereupon the control member can be readily displaced in either direction by rotating the hand crank 71. The serrations are shaped similarly to the serrations seen in FIGS. 8 and 9 and oriented in such a manner that merely turning the crank will permit the cable to be wound on the drum, whereas it can be unwound only by axially pulling the hand crank 71 against the restraint of the spring 73 until the serrations disengage whereupon the crank may be turned to unwind the cable. The cable will remain tensioned by the action of the spring 17.

The simple ratchet arrangement illustrated and described may be modified in many ways. The serrations 68 may be replaced by claws which positively prevent rotation of the crank 71 in either direction so that the crank is to be moved axially before it can be rotated in either direction. The control member 5″ may also simply be fitted with an extension arm the free end of which is accessible to the rider while operating the bicycle, and which can be fastened to the bicycle frame in the several angular positions of the member 5″ corresponding to the desired transmission ratios.

The examples of the transmission arrangement of the invention illustrated in FIGS. 17 to 19 are used to advantage in all types of vehicles in which rotary movement of wheels is actuated by human muscle power, such as three-wheeled invalid chairs, foot or hand-driven railroad inspection cars, self-propelled riding toy vehicles for children, and the like. When equipped with the transmission arrangement of this invention, these vehicles will move in a forward direction regardless of the direction of rotation of the pedals or of equivalent actuating devices.

It will be obvious to those skilled in the art that many of the elements of the specific embodiments illustrated may be modified without exceeding the scope of this invention.

The eccentrics 2" and cams 2 illustrated may be replaced by various other cam means having a plurality of peaks along the circumference of their cam faces instead of the single peak shown in all examples of the invention illustrated. Such multiple peaks will improve the uniformity of output shaft speed. Sliding or rolling contact rollers or collars may be provided as required to reduce friction between the eccentric element and the motion transmitting element, such as the steel band 3 or the rocker arm 3'. The eccentric elements may be integral with the input shaft, or they may be separate members fixedly or disengageably connected to the input shaft. The shafts themselves may be structural units or composite assemblies.

The rocker arms 3' may have flat or arcuately bent contact faces for engagement with the eccentric members. It is specifically contemplated to shape these contact faces in such a manner as to make the movement of the output shaft as uniform as possible. Friction reducing elements may be incorporated in the contact faces.

The flexible tension member which transmits motion from the eccentric member to the overriding clutch need not necessarily be made of steel. For lower stresses it may consist of leather, rubber, hemp ropes, or plastics. Any portion of the flexible member which does not have to bend in a variable arcuate shape during operation of the transmission arrangement may be rigid, and the term "flexible motion transmitting member" as used herein shall be deemed to include motion transmitting members portions of which are rigid. Chains of the roller type, and many other types of chains will meet the requirements for a flexible tension member for the purposes of this invention.

Overriding clutches of known types other than the novel clutch illustrated, for example, in FIGS. 7 to 9 may successfully be incorporated in the transmission arrangement of the invention. Their principle of operation may reside in the jamming of rollers, balls, taper rollers, barrel shaped elements, and the like between two faces of a driving and of a driven member respectively which jointly define a wedge shaped space which tapers in the direction of desired joint movement. Ratchet clutches other than those specifically disclosed are also applicable. Axial, radial, conical, hyperboloidal, and other known clutch types can be used.

The speed control elements of the transmission are capable of extensive modification not requiring the exercise of invention. The gear rim 6' may be made integral with the wheel 5 or the yoke 5' on which it is mounted. The threads of the worm 6 and the cooperating worm wheel rim 6' may be beveled in one direction so as only to prevent spontaneous rotation of the wheel 5 or yoke 5' in the direction toward the idling position of the transmission arrangement whereas the wheel 5 or yoke 5' may be pivoted in the opposite direction by means of a manually operated linkage which causes the worm 6 to skip over the teeth of the gear rim 6' somewhat in the manner of a pawl cooperating with a ratchet. The control arrangements illustrated in FIGS. 17 to 19 in which a threaded rod 86 cooperates with a nut 6" may be utilized in vehicles driven by an engine, not by human muscle power, and equipped with a separate clutch for quick disengagement from the source of motive power if disengagement is considered desirable.

The mechanism for automatic adjustment of the transmission ratio may be modified by substituting bevel gears, pulleys with cables, and other well known motion transmitting elements for the gears and other devices described and shown for the purpose of illustration only. Wherever reference is made to manual operation of a control device, it wil be understood that this will include operation by pedals or in any other manner where control is exercised according to an operator's judgment.

All transmission arrangements illustrated are equipped with parallel input and output shafts, but the invention is not inherently limited to such an arrangement. The fact that a single input shaft in the examples turns a single output shaft does not exclude a combination of a single input shaft with a plurality of output shafts nor the inverse combination of several input shafts acting on a single output shaft. The motion transmitting elements such as cams, eccentrics, cranks, tensioned flexible members, overriding clutches, may be multiplied at will. The input and output shafts may rotate in the same or in opposite directions, and generally the elements of the transmission arrangement of the invention may be assembled in a manner different from those specifically disclosed.

Where return springs are shown, they may be replaced by suitably connected weights, by pneumatic springs, or by electromagnetic restoring forces. Synchromesh clutches where illustrated may be replaced by clutches of different basic characteristics, such as friction clutches, hydraulic, or electromagnetic clutches. Specific types of gearing such as spur gears, bevel gears, and the like, may be replaced by other gearing or combinations of gearing. Indicating instruments may be added to the apparatus to indicate the transmission ratio, and they may derive a signal from the position of the control member 5 or the yoke 5'.

When the prime mover the output of which is transmitted by the transmission arrangement of the invention is a piston engine such as an internal combustion engine or a steam engine, its crankshaft is preferably set in such angular relationship to the eccentric entraining means of the invention such as the crank 2 shown in FIG. 1, the contact roller 2' or the eccentrics 2" and 82, that the cyclic variations in the power and speed of engine output are effectively compensated for uniform speed of the output shaft of the transmission arrangement.

The field of application of the transmission arrangement of the invention includes, but is not limited to vehicles of all kind, such as wheeled, semi-track, and track laying vehicles, and those running on rails, vehicles actuated by piston and turbine type motors employing the energy of fuel combustion directly or through the intermediary of steam, also those actuated by electric motors. The transmission arrangement is suitable to be interposed not only between a prime mover and wheels of a vehicle, but it is also used to advantage to change the speed of other devices in a vehicle that are motor-actuated such as that of boosters for supercharging engine cylinders, boosters and fans for cooling air, water pumps, winches, jacks, inertia starters for vehicles and aircraft in which the energy of a flywheel is transmitted by the transmission of the invention in a shock free gradual manner to the engine which is to be started. The particular suitability of certain embodiments of the invention to vehicles propelled by human muscle power has been mentioned above. The transmission arrangement may also be interposed between a prime mover and ship's propellers and paddle wheels, equally between an engine and the airscrew of an aircraft. Outside the field of transportation, the transmission arrangement of the invention is used to advantage in all types of machine tools nearly all of which require variable speed drives.

It should be understood, of course, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What is claimed and desired to be protected by Letters Patent of the United States is:

1. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for movement along a predetermined path; fastening means on said control member; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

2. In a transmission arrangement with continuously variable transmission ratio, in combination, a support; a driven shaft and a driving shaft rotatably mounted on said support; eccentric entraining means mounted on said driving shaft for rotaition about the axis thereof, said entraining means defining an operating circle about said axis; overrunning clutch means on said driving shaft for actuating rotation thereof in one direction only, said clutch means including driven wheel means; a control member pivotally mounted on said support; fastening means mounted on said control member for movement along a predetermined arcuate path during pivotal movement of said control member; gear means on said support and on said control member for adjusting and securing the relative angular position thereof; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

3. In an arrangement as set forth in claim 2, said gear means including a worm gear mounted on said support and worm wheel means on said control member.

4. In an arrangement as set forth in claim 3, said worm gear being pivoted to said support for movement about an axis transverse of the axis thereof into and out of engagement with said worm wheel means.

5. In an arrangement as set forth in claim 4, resilient means permanently urging said worm gear into engagement with said worm wheel means.

6. In an arrangement as set forth in claim 4, means on said worm gear for disengaging the same from said worm wheel means.

7. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member pivotally mounted on said support; fastening means mounted on said control member for movement along a predetermined path; two threadedly engaged adjusting members, one of said adjusting members being mounted on said support for rotation about an axis, the other adjusting member being mounted on said control member for axial movement on said one adjusting member during rotation thereof for adjusting the angular position of said control member; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

8. In a transmission arrangement with continuously variable transmitting ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for reciprocating movement along a predetermined path; abutment means on said support for limiting said reciprocating movement; fastening means on said control member; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

9. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for movement along a predetermined path; actuating means mounted on said support and operatively connected to said driven shaft, said actuating means being engageable with said control member for moving the same along said path; fastening means on said control member; and elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

10. In a transmission arrangement with continuously variable transmission ratio, in combination, a support; a driven shaft and a driving shaft rotatably mounted on said support; eccentric entraining means mounted on said driven shaft for rotation about the axis thereof, said entraining means including a contact member rotatable about an axis spaced from and parallel to the axis of said driven shaft, said contact member during rotation of said driven shaft defining an operating circle about said axis; overrunning clutch means on said driving shaft for actuating rotation thereof in one direction only, said clutch means including driven wheel means; a control member mounted on said support for movement along a predetermined path; fastening means on said control member; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said contact member of said eccentric entraining means; and means for tensioning said motion transmitting member.

11. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for movement along a predetermined path; fastening means on said control member; an elongated flexible motion transmitting member having two longitudinally spaced end portions, one of said end portions being rigid and being secured to said fastening means, a driving portion intermediate said end portions and trained over said wheel means for transmitting motion in said one direction to said driving shaft, and a contact portion intermediate said one end portion and said drving portion, said contact portion moving in a radial direction in said operating circle when said control member moves along said predetermined path for contact with said eccentric entraining means; and means for tensioning said motion transmitting member.

12. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for movement along a predetermined path; fastening means on said control member; an elongated flexible motion transmitting member having two longitudinally spaced end portions, one of said end portions being rigid and being secured to said fastening means, a driving portion intermediate said end portions and trained over said wheel means for transmitting motion in said one direction to said driving shaft, and a rigid contact portion integral with said one end portion and arranged intermediate the same and said driving portion, said contact portion moving in a radial direction in said operating circle when said control member moves along said predetermined path for contact with said eccentric entraining means; and means for tensioning said motion transmitting member.

13. In a transmission arrangement with continuously variable transmission ratio, in combination, a support; a driven shaft and a driving shaft rotatably mounted on said support; eccentric entraining means mounted on said driven shaft for rotation about the axis thereof, said entraining means defining an operating circle about said axis; overrunning clutch means on said driving shaft for actuating rotation thereof in one direction only, said clutch means including driven wheel means; a control member mounted on said support for movement along a predetermined path; fastening means on said control member; an elongated flexible motion transmitting member having two longitudinally spaced end portions, one of said end portions being rigid and being secured to said fastening means, a driving portion intermediate said end portions and trained over said wheel means for transmitting motion in said one direction to said driving shaft; and a rigid contact portion integral with said one end portion and arranged intermediate the same and said driving portion, said contact portion including a contact element transversely projecting from said elongated motion transmitting member and moving in a radial direction in said operating circle when said control member moves along said predetermined path for contact of said contact element with said eccentric entraining means; and means for tensioning said motion transmitting member.

14. In a transmission arrangement with continuously variable transmission ratio, in combination, a support; a driven shaft and a driving shaft rotatably mounted on said support; two eccentric entraining means mounted on said driven shaft in angularly offset relationship for rotation about the axis thereof, each of said entraining means defining an operating circle about said axis; two overrunning clutch means on said driving shaft for actuating rotation thereof in one direction only, each of said clutch means including driven wheel means; a control member mounted on said support for movement along a predetermined path; fastening means on said control member; two elongated flexible motion transmitting members each having two longitudinally spaced end portions, one of said end portions being secured to said fastening means, a driving portion intermediate said end portions and trained over one of said wheel means for transmitting motion in said one direction to said driving shaft, and a contact portion intermediate said one end portion and said driving portion, said contact portion moving in a radial direction in a respective one of said operating circles when said control member moves along said predetermined path for contact with said eccentric entraining means; and means for tensioning said motion transmitting members.

15. In a transmission arrangement with continuously variable transmission ratio, in combination, a support; a driven shaft and a driving shaft rotatably mounted on said support; two eccentric entraining means mounted on said driven shaft in angularly offset relationship for rotation about the axis thereof, each of said entraining means defining an operating circle about said axis; two overrunning clutch means on said driving shaft for actuating rotation thereof in one direction only, each of said clutch means including driven wheel means; a control member mounted on said support for movement along a predetermined path; fastening means on said control member; two elongated flexible motion transmitting members each having two longitudinally spaced end portions, one of said end portions being secured to said fastening means, a driving portion intermediate said end portions and trained over one of said wheel means for transmitting motion in said one direction to said driving shaft, and a contact portion intermediate said one end portion and said driving portion, said contact portion moving in a radial direction in a respective one of said operating circles when said control member moves along said predetermined path for contact with said eccentric entraining means; and means secured to the respective other end portions of said motion transmitting members for connecting the same and for tensioning said motion transmitting members.

16. In a transmission arrangement with continuously variable transmission ratio, in combination, a support; a driven shaft and a driving shaft rotatably mounted on said support; eccentric entraining means mounted on said driven shaft for rotation about theaxis thereof, said entraining means defining an operating circle about said axis; overrunning clutch means on said driving shaft for actuating rotation thereof in one direction only, said clutch means including driven wheel means; a control member pivotally mounted on said support for reciprocating movement between two terminal positions; fastening means mounted on said control member for movement along a predetermined arcuate path during pivotal movement of said control member; gear means on said support and on said control member for adjusting and securing the relative angular position thereof; disengaging means on said control member for disengaging said gear means when said control member reaches one of said terminal positions thereof; an elongated flexible motion transmitting member having two longitudinally spaced end portions, one of said end portions being secured to said fastening means, a driving portion intermediate said end portions and trained over said wheel means for transmitting motion in said one direction to said driving shaft, and a contact portion intermediate said one end portion and said driving portion, said contact portion moving in a radial direction in said operating circle when said control member moves along said predetermined path for contact with said eccentric entraining means; and means for tensioning said motion transmitting member.

References Cited in the file of this patent

UNITED STATES PATENTS

| | | |
|---|---|---|
| 1,788,729 | Meier | Jan. 13, 1931 |
| 2,672,062 | DeMarchi | Mar. 16, 1954 |

FOREIGN PATENTS

| | | |
|---|---|---|
| 592,572 | France | May 2, 1925 |
| 509,900 | Italy | Jan. 22, 1955 |